United States Patent
Chiu et al.

(10) Patent No.: US 8,432,107 B2
(45) Date of Patent: Apr. 30, 2013

(54) BACKLIGHT MODULE, OVER-TEMPERATURE PROTECTION CIRCUIT AND OVER-TEMPERATURE PROTECTION METHOD THEREOF

(75) Inventors: Kun-Chi Chiu, Miaoli County (TW); Yun-Chih Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 232 days.

(21) Appl. No.: 13/110,004

(22) Filed: May 18, 2011

(65) Prior Publication Data

US 2012/0229047 A1 Sep. 13, 2012

(30) Foreign Application Priority Data

Mar. 9, 2011 (TW) ............................. 100107940 A

(51) Int. Cl.
*H05B 37/02* (2006.01)
*H02H 3/00* (2006.01)

(52) U.S. Cl.
USPC ............................................ 315/291; 361/18

(58) Field of Classification Search .................... None
See application file for complete search history.

(56) References Cited

U.S. PATENT DOCUMENTS 5,020,362 A * 6/1991 Hart et al. .................. 73/114.43
2008/0094009 A1* 4/2008 Koyama et al. ............... 315/307

FOREIGN PATENT DOCUMENTS

TW M363016 8/2009

* cited by examiner

*Primary Examiner* — Crystal L Hammond
(74) *Attorney, Agent, or Firm* — Jianq Chyun IP Office

(57) ABSTRACT

An over-temperature protection circuit is adapted to a light source driver coupled to a light-emitting device. The light source driver has a current setting terminal receiving a set current to control the magnitude of a current flowing through the light-emitting device. The over-temperature protection circuit includes a first, second, and third resistors, a thermal resistor measuring temperature of the light-emitting device, and a diode. A first terminal of the first resistor provides the set current to the current setting terminal. The second resistor is coupled between the first resistor and a ground voltage in series. A first terminal of the thermal resistor is coupled to a reference voltage. The third resistor is coupled between the thermal resistor and the ground voltage in series. An anode and a cathode of the diode are respectively coupled to a second terminal of the thermal resistor and a second terminal of the first resistor.

13 Claims, 3 Drawing Sheets

BACKLIGHT MODULE, OVER-TEMPERATURE PROTECTION CIRCUIT AND OVER-TEMPERATURE PROTECTION METHOD THEREOF

CROSS-REFERENCE TO RELATED APPLICATION

This application claims the priority benefit of Taiwan application serial no. 100107940, filed Mar. 9, 2011. The entirety of the above-mentioned patent application is hereby incorporated by reference herein and made a part of this specification.

BACKGROUND OF THE INVENTION

1. Field of the Invention

The invention relates to a backlight module, an over-temperature protection circuit, and an over-temperature protection method thereof. More particularly, the invention relates to a backlight module in which a light-emitting diode (LED) serves as a backlight source, an over-temperature protection circuit, and an over-temperature protection method thereof.

2. Description of Related Art

With the advancement in semiconductor industry, flat panel displays (FPDs) gradually replace conventional cathode ray tube (CRT) displays and have become the mainstream of displays in the market. Liquid crystal displays (LCDs) are the most mature and popular displays among the FPDs. Nonetheless, LCD panels are not capable of emitting light, and therefore backlight modules need to be configured below the LCD panels for providing light sources and achieving display functions. Due to the advantages of long life span, high efficiency, and low environmental pollution, LEDs often serve as the backlight sources of the backlight modules in the LCDs.

In general, a driving circuit of a LED generates a driving voltage via a DC-DC converter, so as to drive the LED to emit light. The driven LED simultaneously emits light and generates heat. Accordingly, the temperature of the LED is raised, and a forward voltage and a forward current of the LED are lowered down together with the increase in the temperature of the LED. Since the driving circuit is not able to sense the temperature of the LED, the driving circuit of the LED cannot make proper adjustment in response to changes to the temperature of the LED. Thereby, when the temperature of the LED is raised, the driving voltage and the current flowing through the LED stay unchanged. Consequently, the excessively high temperature of the LED easily leads to deterioration of the electrical property and reduction of the life span of the LED. To resolve said issue, an over-temperature protection circuit has been installed in the backlight module according to the related art.

FIG. 1 is a schematic view illustrating a system of a conventional backlight module. With reference to FIG. 1, in a backlight module 100, a DC-DC converter 110 generates a driving voltage $V_D$ to drive LEDs Da~Dc. Here, a current $I_D$ flows through the LEDs Da~Dc. Transistors TR1 and TR2 and a thermal resistor $R_{PTC}$ together constitute an over-temperature protection circuit. Here, the thermal resistor $R_{PTC}$ measures the temperature of the LEDs Da~Dc and has a positive temperature coefficient. When the temperature of the LEDs Da~Dc falls within an acceptable range, a voltage Va is changed in response to variations in the resistance of the thermal resistor $R_{PTC}$, and thereby the current $I_D$ can be adjusted. However, in order not to turn on the transistor TR2, the voltage Va is set to be less than a forward bias $V_{BE}$ at a base and an emitter of the transistor TR2. For instance, the voltage Va is set to be 0.5 V~0.69 V.

When the temperature of the LEDs Da~Dc goes beyond the acceptable range, the excessive resistance of the thermal resistor $R_{PTC}$ results in the fact that the voltage Va is greater than or substantially equal to the forward bias $V_{BE}$ of the transistor TR2, such that the transistor TR2 is turned on. At this time, a voltage Vb at a base of the transistor TR1 is coupled to a ground voltage, and a pulse width modulation (PWM) signal $S_{PWM}$ controlling the transistor TR1 is equivalent to be grounded because the transistor TR2 is turned on. As such, the transistor TR1 is turned off, the current $I_D$ cannot flow through the LEDs Da~Dc, and the LEDs Da~Dc cannot emit light.

When the temperature of the LEDs Da~Dc again falls within the acceptable range, the resistance of the thermal resistor $R_{PTC}$ returns to an appropriate value, so as to allow the LEDs Da~Dc to emit light normally. Although the over-temperature protection circuit can perform the function of protection, the power consumption of the thermal resistor $R_{PTC}$ poses an impact on the conversion efficiency of the DC-DC converter 110 due to the structure of the over-temperature protection circuit. Moreover, the over-temperature protection circuit protects the LEDs Da~Dc by turning off the transistor TR1. In this case, the LEDs Da~Dc are likely to be switched to emit light or not, which may cause flickers and unfavorable visual effects.

SUMMARY OF THE INVENTION

The invention is directed to a backlight module, an over-temperature protection circuit, and an over-temperature protection method thereof, wherein a light source driver adjusts a magnitude of a current flowing through a light-emitting device based on a set current. In an embodiment of the invention, when the temperature of the light-emitting device is overly high, a magnitude of the set current is reduced to lower the temperature of the light-emitting device. Thereby, over-temperature of the light-emitting device is unlikely to occur.

The invention provides an over-temperature protection circuit. The over-temperature protection circuit is adapted to a light source driver that is coupled to a light-emitting device. The light source driver has a current setting terminal that receives a set current. Based on the set current, the light source driver controls a magnitude of a current flowing through the light-emitting device. The over-temperature protection circuit includes a first resistor, a second resistor, a third resistor, a thermal resistor, and a diode. A first terminal of the first resistor is coupled to the current setting terminal to provide the set current. The second resistor is coupled between a second terminal of the first resistor and a ground voltage. A first terminal of the thermal resistor is coupled to a reference voltage and is used for measuring temperature of the light-emitting device. The third resistor is coupled between a second terminal of the thermal resistor and the ground voltage. An anode and a cathode of the diode are respectively coupled to the second terminal of the thermal resistor and the second terminal of the first resistor.

The invention also provides a backlight module that includes a light source driver, a light-emitting device, and an over-temperature protection circuit. The light source driver has a current setting terminal and a light source driving terminal. The current setting terminal receives a set current, and the light source driver controls a magnitude of a current at the light source driving terminal based on the set current. The light-emitting device is coupled between a driving voltage and the light source driving terminal of the light source driver. The over-temperature protection circuit includes a first resistor, a second resistor, a third resistor, a thermal resistor, and a diode. A first terminal of the first resistor is coupled to the current setting terminal to provide the set current. The second resistor is coupled between a second terminal of the first resistor and a ground voltage. A first terminal of the thermal resistor is coupled to a reference voltage and is used for measuring the temperature of the light-emitting device. The third resistor is coupled between a second terminal of the thermal resistor and the ground voltage. An anode and a cathode of the diode are respectively coupled to the second terminal of the thermal resistor and the second terminal of the first resistor.

According to an embodiment of the invention, the diode is a Schottky diode.

According to an embodiment of the invention, the thermal resistor has a negative temperature coefficient.

According to an embodiment of the invention, a resistance of the third resistor is $R_{TTP}/((VDD/V1)-1)$, $R_{TTP}$ is a resistance of the thermal resistor corresponding to a threshold temperature, VDD is the reference voltage, V1 is a voltage at the second terminal of the first resistor, and VDD is greater than V1.

According to an embodiment of the invention, the thermal resistor is configured beside the light-emitting device.

According to an embodiment of the invention, the light-emitting device includes at least one LED.

The invention further provides an over-temperature protection method. The over-temperature protection method is adapted to a backlight module that has a light-emitting device and a light source driver. The light source driver has a current setting terminal that receives a set current. Besides, the light source driver is coupled to the light-emitting device. Based on the set current, the light source driver controls a magnitude of a current flowing through the light-emitting device. The over-temperature protection method includes following steps. A temperature of the light-emitting device is measured. When the temperature of the light-emitting device is greater than a threshold temperature, a magnitude of the set current is reduced. When the temperature of the light-emitting device is less than the threshold temperature, the set current is configured to have a predetermined value.

According to an embodiment of the invention, the temperature of the light-emitting device is measured by a thermal resistor.

Based on the above, in the backlight module, the over-temperature protection circuit, and the over-temperature protection method thereof, as described in the embodiments of the invention, whether a divided voltage of an thermal resistor and the third resistor is greater than a divided voltage of the first resistor and the second resistor is determined by the diode, and thereby whether the temperature of the light-emitting device is excessively high is determined. If the temperature of the light-emitting device is overly high, the divided voltage of the thermal resistor and the third resistor is greater than the divided voltage of the first resistor and the second resistor, and the voltage at the second terminal of the first resistor is pulled up, so as to reduce the magnitude of the set current and further reduce the magnitude of the current flowing through the light-emitting device. Thereby, the temperature of the light-emitting device can be lowered down. In brief, since the light-emitting device can be protected by simple circuitry, neither the over-temperature of the light-emitting device nor image flickers occur.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
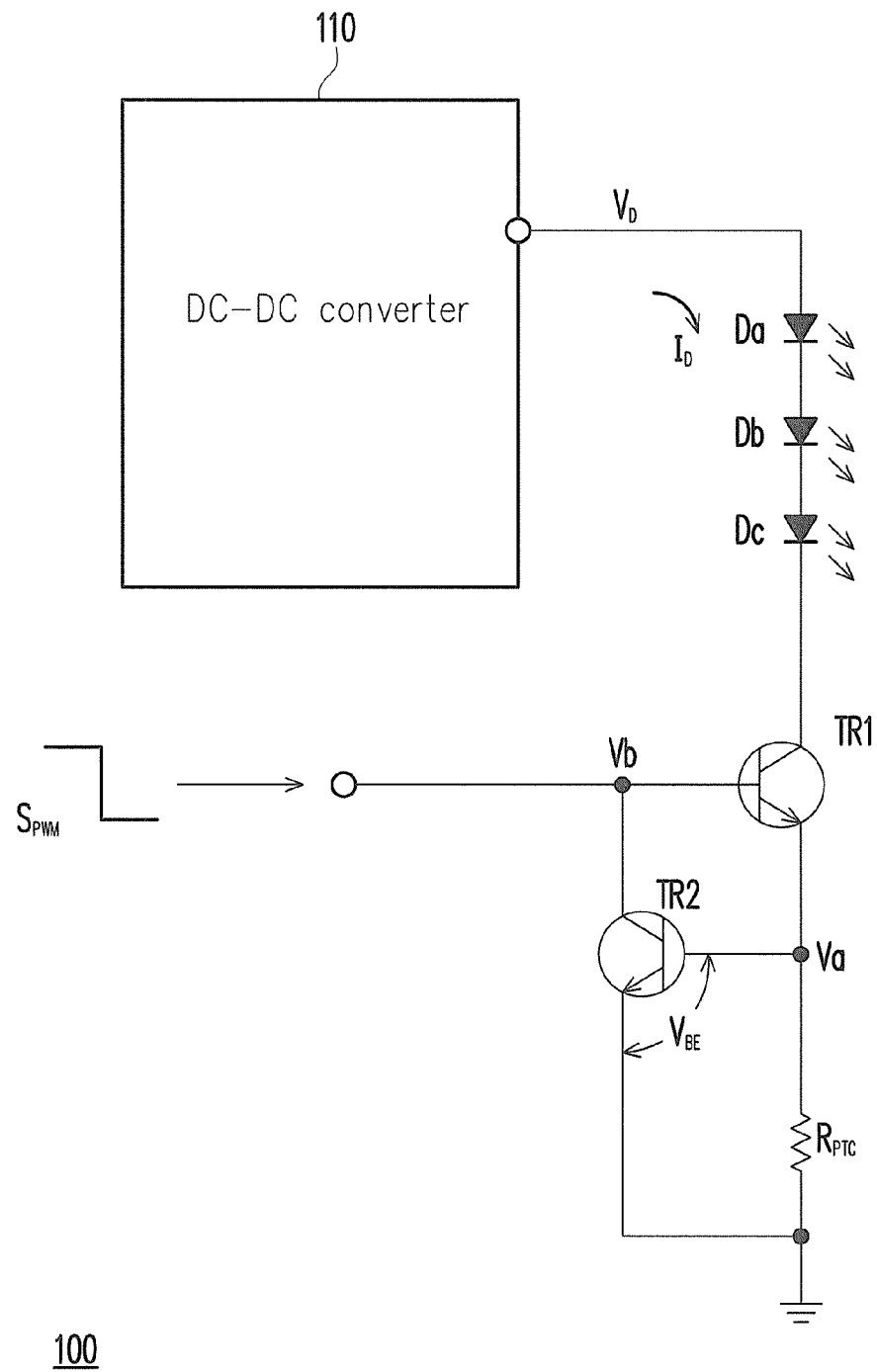
FIG. 1 is a schematic view illustrating a system of a conventional backlight module.
Figure 2:
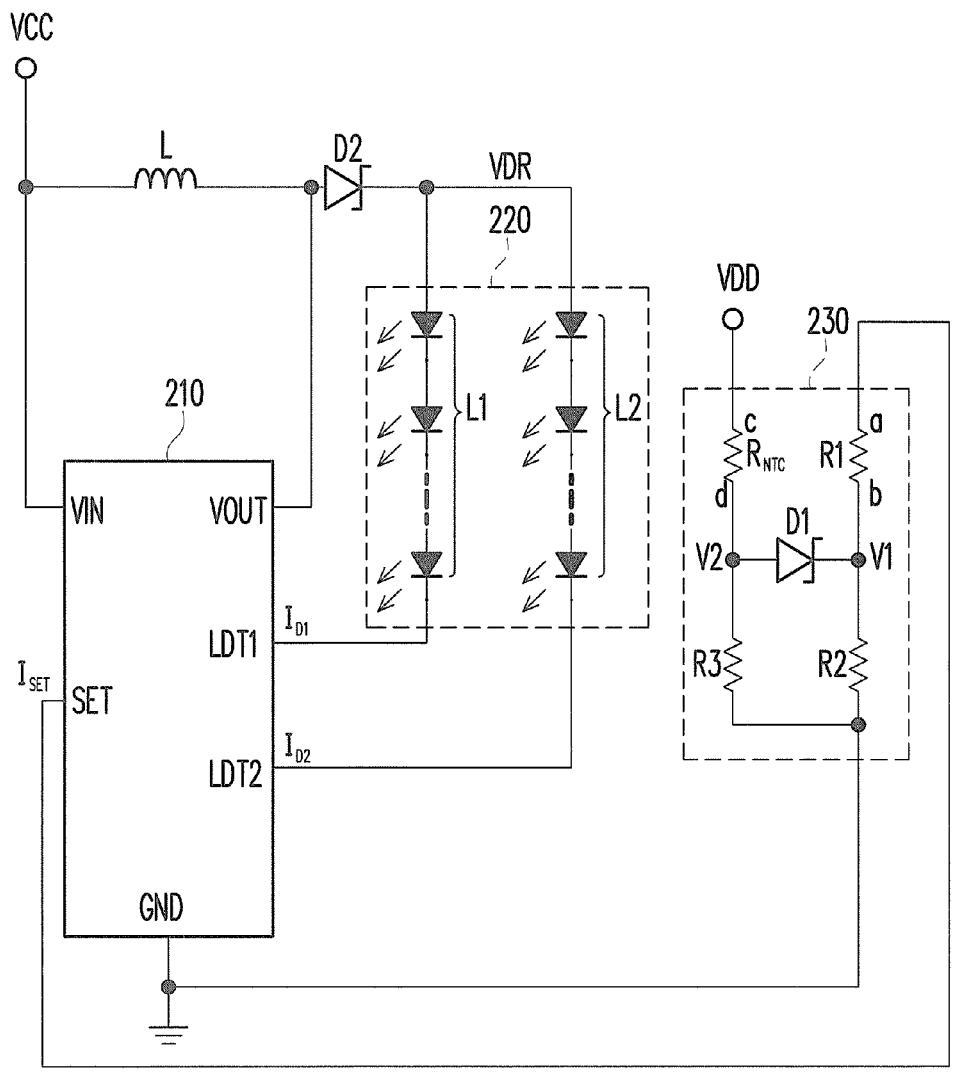
FIG. 2 is a schematic view illustrating a system of a backlight module according to an embodiment of the invention.

FIG. 2 is a schematic view illustrating a system of a backlight module according to an embodiment of the invention. With reference to FIG. 2, in this embodiment, the backlight module 200 at least includes a light source driver 210, a light-emitting device 220, and an over-temperature protection circuit 230. The light source driver 210 has a voltage input terminal VIN, a voltage output terminal VOUT, a ground terminal GND, a current setting terminal SET, and at least one light source driving terminal (e.g., LDT1 and LDT2). Here, the amount of the light source driving terminal is determined based on the circuit structure of the light-emitting device 220.

In the light source driver 210, the voltage input terminal VIN receives a system voltage VCC, the voltage output terminal VOUT outputs a driving voltage VDR to the light-emitting device 220, the current setting terminal SET receives a set current $I_{SET}$, the ground terminal GND is coupled to a ground voltage, and the light source driving terminals (e.g., LDT1 and LDT2) are coupled to the light-emitting device 220 to control the current flowing through the light-emitting device 220. The light source driver 210 controls the magnitude of the current (e.g., $I_{D1}$ and $I_{D2}$) at the light source driving terminals (e.g., LDT1 and LDT2) based on the set current $I_{SET}$. Namely, the light source driver 210 controls the magnitude of the current flowing through the light-emitting device 220. The magnitude of the current at the light source driving terminals (e.g., LDT1 and LDT2) is in direct proportion to the magnitude of the set current $I_{SET}$.

The over-temperature protection circuit 230 is coupled to the current setting terminal SET of the light source driver 210 to provide the set current $I_{SET}$. Besides, the over-temperature protection circuit 230 adjusts the magnitude of the set current $I_{SET}$ based on the temperature of the light-emitting device 220. That is to say, when the temperature of the light-emitting device 220 is not overly high, i.e., less than or substantially equal to a threshold temperature, the set current $I_{SET}$ provided by the over-temperature protection circuit 230 has a predetermined value. When the temperature of the light-emitting device 220 is overly high, i.e., greater than the threshold temperature, the over-temperature protection circuit 230 reduces the magnitude of the set current $I_{SET}$, so as to allow the light source driver 210 to reduce the magnitude of the current flowing through the light-emitting device 220. As such, the temperature of the light-emitting device 220 is reduced, and the light-emitting device 220 can be prevented from aging and being damaged by the excessively high temperature.

In this embodiment, the over-temperature protection circuit 230 includes a first resistor R1, a second resistor R2, a third resistor R3, a thermal resistor $R_{NTC}$, and a diode D1. The thermal resistor $R_{NTC}$ has a negative temperature coefficient, for instance. The diode D1 is a Schottky diode, for instance. A first terminal a of the first resistor R1 is coupled to the current setting terminal SET of the light source driver 210 to provide the set current $I_{SET}$. The second resistor R2 is coupled between a second terminal b of the first resistor R1 and a ground voltage. A first terminal c of the thermal resistor $R_{NTC}$ is coupled to a reference voltage VDD. Here, the thermal resistor $R_{NTC}$ can be configured beside the light-emitting device 220, so as to measure the temperature of the light-emitting device 220. The third resistor R3 is coupled between a second terminal d of the thermal resistor $R_{NTC}$ and the ground voltage. An anode and a cathode of the diode D1 are respectively coupled to the second terminal d of the thermal resistor $R_{NTC}$ and the second terminal b of the first resistor R1.

When the temperature of the light-emitting device 220 is less than or substantially equal to the threshold temperature, the resistance of the thermal resistor $R_{NTC}$ is relatively high, such that the divided voltage V2 of the thermal resistor $R_{NTC}$ and the third resistor R3 is less than or substantially equal to the divided voltage V1 of the first resistor R1 and the second resistor R2, i.e., the voltage at the second terminal b of the first resistor R1. At this time, the diode D1 is not turned on because of a reverse bias or an insufficient bias, and the set current $I_{SET}$ is equal to the voltage of the current setting terminal SET divided by the resistance of the first and second resistors R1 and R2, i.e., the predetermined value of the set current $I_{SET}$.

By contrast, when the temperature of the light-emitting device 220 is greater than the threshold temperature, the resistance of the thermal resistor $R_{NTC}$ is relatively low, such that the divided voltage V2 is greater than the divided voltage V1. At this time, the diode D1 is turned on because of the forward bias, such that the divided voltage V1 is affected by the divided voltage V2 and is thus pulled up. Since the divided voltage V1 is pulled up, the cross voltage of the first resistor R1 is reduced, and the magnitude of the set current $I_{SET}$ is reduced. Here, the set current $I_{SET}$ is equal to the voltage of the current setting terminal SET which subtracts the divided voltage V1 and then is divided by the resistance of the first resistor R1. Namely, the equivalent resistance at the current setting terminal SET of the light source driver 210 increases.

Moreover, the resistance of the thermal resistor $R_{NTC}$ is changed together with variations in the temperature of the light-emitting device 220. Hence, the resistance of the third resistor R3 needs to be specifically configured, such that the divided voltage V2 is greater than the divided voltage V1 when the temperature of the light-emitting device 220 is greater than the threshold temperature, and that the divided voltage V2 is less than or substantially equal to the divided voltage V1 when the temperature of the light-emitting device 220 is less than or substantially equal to the threshold temperature. In view of the foregoing, the resistance of the third resistor R3 is equal to $R_{TTP}/((VDD/V1)-1)$. Here, $R_{TTP}$ refers to the resistance of the thermal resistor $R_{NTC}$ corresponding to the threshold temperature, and the reference voltage VDD is far greater than the divided voltage V1. For instance, given the resistance of the thermal resistor $R_{NTC}$ corresponding to the threshold temperature (e.g., 70° C.) is 12 kΩ, the reference voltage VDD is 3 V, and the divided voltage V1 is 0.6 V, the resistance of the third resistor R3 is 12 kΩ/((3/0.6)−1)=3 kΩ.

According to this embodiment, the light-emitting device 220 includes LED series L1 and L2. The number of the LEDs in the LED series L1 is approximately the same as the number of the LEDs in the LED series L2, which should not be construed as a limitation to the invention. Besides, the light-emitting device 220 includes two LED series L1 and L2. Therefore, the light source driver 210 corresponds to two light source driving terminals LDT1 and LDT2, so as to be respectively coupled to the LED series L1 and L2. However, in other embodiments of the invention, the number of the light source driving terminals can be adjusted in response to the number of the LED series. In this embodiment, the driving voltage VDR received by the light-emitting device 220 is provided by the light source driver 210, while the driving voltage VDR can be supplied by other devices or circuits in other embodiments, which should not be construed as a limitation to the invention.

The backlight module 200 of this embodiment can further include an inductor L and another diode D2, so as to filter out the noise of the driving voltage VDR and further stabilize the driving voltage VDR. Here, the inductor L is coupled between the voltage input terminal VIN and the voltage output terminal VOUT of the light source driver 210. The diode D2 is forward-coupled between the voltage output terminal VOUT of the light source driver 210 and the light-emitting device 220.

Figure 3:
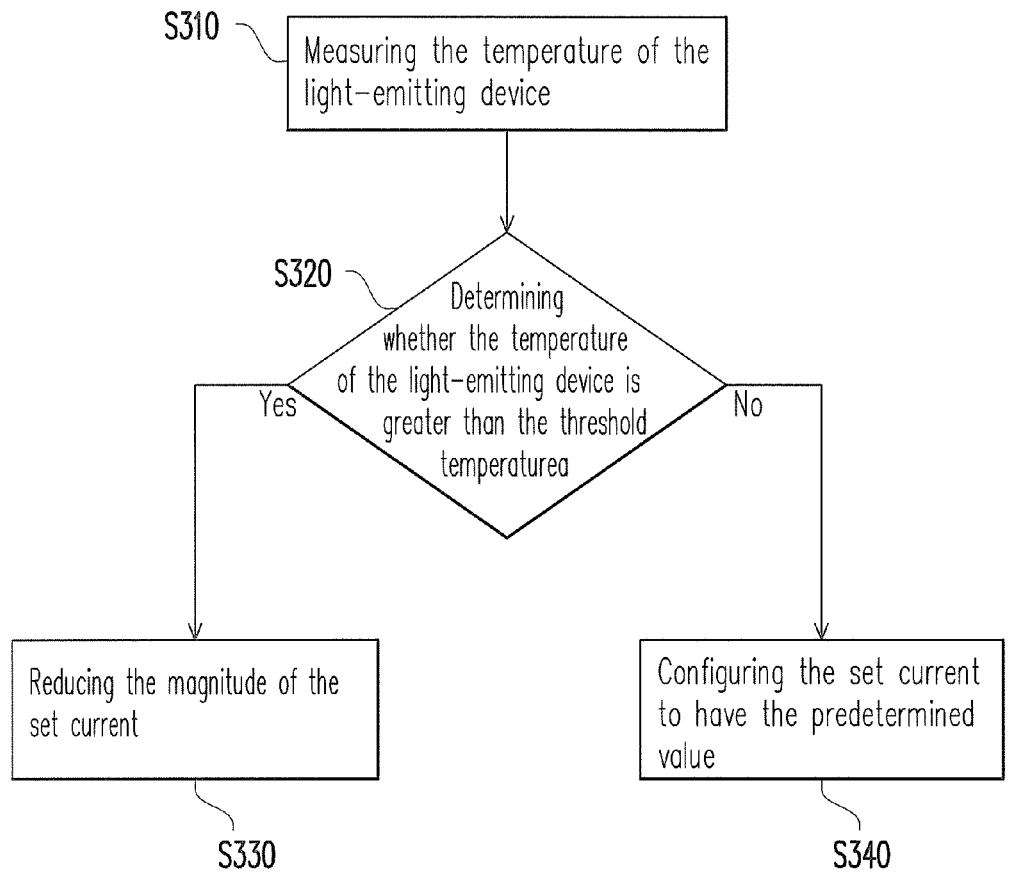
FIG. 3 is a flow chart illustrating an over-temperature protection method according to an embodiment of the invention.

An over-temperature protection method applicable to the backlight module 200 can be deduced from the above descriptions. FIG. 3 is a flow chart illustrating an over-temperature protection method according to an embodiment of the invention. With reference to FIG. 3, in this embodiment, the temperature of the light-emitting device is measured in step S310. Whether the temperature of the light-emitting device is greater than the threshold temperature is determined in step S320. When the temperature of the light-emitting device is determined to be greater than the threshold temperature, i.e., the result of determination is "Yes", the magnitude of the set current is reduced in step S330. On the contrary, when the temperature of the light-emitting device is determined to be less than or substantially equal to the threshold temperature, i.e., the result of determination is "No", the set current is configured to have the predetermined value. The details of the over-temperature protection method can refer to the descriptions of the backlight module 200, as provided in the previous embodiments, and thus are not reiterated herein.

To sum up, in the backlight module, the over-temperature protection circuit, and the over-temperature protection method thereof, as described in the embodiments of the invention, whether a divided voltage of an thermal resistor and the third resistor is greater than a divided voltage of the first resistor and the second resistor is determined by the diode, and thereby whether the temperature of the light-emitting device is excessively high is determined. If the temperature of the light-emitting device is overly high, the divided voltage of the thermal resistor and the third resistor is greater than the divided voltage of the first resistor and the second resistor, and the voltage at the second terminal of the first resistor is pulled up, so as to reduce the magnitude of the set current and further reduce the magnitude of the current flowing through the light-emitting device. Accordingly, the temperature of the light-emitting device can be lowered down. Since the light-emitting device can be protected by simple circuitry, neither the over-temperature of the light-emitting device nor image flickers occur.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An over-temperature protection circuit adapted to a light source driver coupled to a light-emitting device, the light source driver having a current setting terminal receiving a set current, the light source driver controlling a magnitude of a current flowing through the light-emitting device based on the set current, the over-temperature protection circuit comprising:
   a first resistor, a first terminal of the first resistor being coupled to the current setting terminal to provide the set current;
   a second resistor coupled between a second terminal of the first resistor and a ground voltage;
   a thermal resistor for measuring a temperature of the light-emitting device, a first terminal of the thermal resistor being coupled to a reference voltage;
   a third resistor coupled between a second terminal of the thermal resistor and the ground voltage; and
   a diode, an anode of the diode being coupled to the second terminal of the thermal resistor, a cathode of the diode being coupled to the second terminal of the first resistor.

2. The over-temperature protection circuit as recited in claim 1, wherein the diode is a Schottky diode.

3. The over-temperature protection circuit as recited in claim 1, wherein the thermal resistor has a negative temperature coefficient.

4. The over-temperature protection circuit as recited in claim 3, wherein a resistance of the third resistor is $R_{TTP}/((VDD/V1)-1)$, $R_{TTP}$ is a resistance of the thermal resistor corresponding to a threshold temperature, VDD is the reference voltage, V1 is a voltage at the second terminal of the first resistor, and VDD is greater than V1.

5. The over-temperature protection circuit as recited in claim 1, wherein the thermal resistor is configured beside the light-emitting device.

6. A backlight module comprising:
   a light source driver having a current setting terminal and a light source driving terminal, the current setting terminal receiving a set current, the light source driver controlling a magnitude of a current at the light source driving terminal based on the set current;
   a light-emitting device coupled between a driving voltage and the light source driving terminal of the light source driver; and
   an over-temperature protection circuit comprising:
      a first resistor, a first terminal of the first resistor being coupled to the current setting terminal to provide the set current;
      a second resistor coupled between a second terminal of the first resistor and a ground voltage;
      a thermal resistor for measuring a temperature of the light-emitting device, a first terminal of the thermal resistor being coupled to a reference voltage;
      a third resistor coupled between a second terminal of the thermal resistor and the ground voltage; and
      a diode, an anode of the diode being coupled to the second terminal of the thermal resistor, a cathode of the diode being coupled to the second terminal of the first resistor.

7. The backlight module as recited in claim 6, wherein the diode is a Schottky diode.

8. The backlight module as recited in claim 6, wherein the thermal resistor has a negative temperature coefficient.

9. The backlight module as recited in claim 8, wherein a resistance of the third resistor is $R_{TTP}/((VDD/V1)-1)$, $R_{TTP}$ is a resistance of the thermal resistor corresponding to a threshold temperature, VDD is the reference voltage, V1 is a voltage at the second terminal of the first resistor, and VDD is greater than V1.

10. The backlight module as recited in claim 6, wherein the thermal resistor is configured beside the light-emitting device.

11. The backlight module as recited in claim 6, wherein the light-emitting device comprises at least one light-emitting diode.

12. An over-temperature protection method adapted to a backlight module having a light-emitting device and a light source driver, the light source driver having a current setting terminal receiving a set current, the light source driver being coupled to the light-emitting device and controlling a magnitude of a current flowing through the light-emitting device based on the set current, the over-temperature protection method comprising:
   measuring a temperature of the light-emitting device;
   reducing a magnitude of the set current when the temperature of the light-emitting device is greater than a threshold temperature; and
   configuring the set current to have a predetermined value when the temperature of the light-emitting device is less than the threshold temperature.

13. The over-temperature protection method as recited in claim 12, wherein the temperature of the light-emitting device is measured by a thermal resistor.

* * * * *